(12) United States Patent
Kim et al.

(10) Patent No.: US 7,940,645 B2
(45) Date of Patent: May 10, 2011

(54) PROTECTION SWITCHING METHOD BASED ON CHANGE IN LINK STATUS IN ETHERNET LINK AGGREGATION SUBLAYER

(75) Inventors: Dae-ub Kim, Daejeon-si (KR); Jeong-dong Ryoo, Daejeon-si (KR); Bheom-soon Joo, Daejeon-si (KR); Young-sun Kim, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 256 days.

(21) Appl. No.: 12/156,488

(22) Filed: Jun. 2, 2008

(65) Prior Publication Data

US 2009/0154337 A1    Jun. 18, 2009

(30) Foreign Application Priority Data

Dec. 12, 2007  (KR) .................. 10-2007-0129179

(51) Int. Cl.
*G01R 31/08* (2006.01)
(52) U.S. Cl. ..................................... 370/216
(58) Field of Classification Search .......... 370/216–225, 370/227, 228, 464, 465, 498, 469, 401, 475; 714/4; 398/72, 76
See application file for complete search history.

(56) References Cited

U.S. PATENT DOCUMENTS

| | | | | |
|---|---|---|---|---|
| 4,969,146 A | * | 11/1990 | Twitty et al. | 370/338 |
| 6,910,149 B2 | * | 6/2005 | Perloff et al. | 714/4 |
| 2003/0012135 A1 | | 1/2003 | Leroux et al. | |
| 2003/0043736 A1 | | 3/2003 | Gonda | |
| 2005/0195835 A1 | * | 9/2005 | Savage et al. | 370/401 |
| 2008/0074996 A1 | * | 3/2008 | Fourcand | 370/225 |

FOREIGN PATENT DOCUMENTS

| | | |
|---|---|---|
| KR | 1020030000177 A | 1/2003 |
| KR | 1020040003290 A | 1/2004 |
| KR | 10-2004-0058636 A | 7/2004 |
| KR | 10-2006-0071086 A | 6/2006 |
| WO | WO 03/021858 A1 | 3/2003 |

\* cited by examiner

*Primary Examiner* — Derrick W Ferris
*Assistant Examiner* — Mang Yeung
(74) *Attorney, Agent, or Firm* — Blakely, Sokoloff, Taylor & Zafman

(57) ABSTRACT

An Ethernet protection switching method based on a change in link status in a link aggregation sublayer is disclosed. If an Ethernet link aggregation sublayer is present on an Ethernet connection path, a link aggregation sublayer Management Entity Group (MEG) end point is assigned to the Ethernet link aggregation sublayer to generate a link aggregation message for Ethernet connection management and protection switching. When a change in link status is detected in the Ethernet link aggregation sublayer, the link-aggregation-sublayer MEG end point generates and sends the link aggregation message to an MEG end point performing Ethernet connection management and protection switching. Adequate Ethernet protection switching may be performed even in the presence of the link aggregation sublayer.

6 Claims, 5 Drawing Sheets

FIG.4

| Link Aggregation Group Identification Information | Link Aggregation Group Member Identification Information | Message Type Information | Message Specific Information | Initial Information | Link Change Information |
|---|---|---|---|---|---|

PROTECTION SWITCHING METHOD BASED ON CHANGE IN LINK STATUS IN ETHERNET LINK AGGREGATION SUBLAYER

CROSS REFERENCE TO RELATED APPLICATIONS

This application claims priority from Korean Patent Application No. 10-2007-0129179, filed on Dec. 12, 2007, the disclosure of which is incorporated herein its entirety by reference.

BACKGROUND OF THE INVENTION

1. Field of the Invention

The present invention relates to an Ethernet protection switching method, and more particularly to an Ethernet protection switching method based on a change in link status in an Ethernet link aggregation sublayer, wherein, when faults occur in an Ethernet link, the Ethernet link is protection-switched to an adequate link.

This work was supported by the IT R&D program of Ministry of Information and Communication (MIC)/Institute for Information Technology Advancement (IITA) [2005-S-102-03. Carrier Class Ethernet Technology].

2. Description of the Related Art

Ethernet protection switching may be performed in various manners, such as protection switching in a physical layer via detection of a fault at an optical link; transmission of information with an additional Ethernet frame through a protection link upon occurrence of a fault in an Ethernet link; simultaneous data transmission to dual links and use of one link selected from the dual links, and protection switching in a Physical Medium Dependent (PMD) layer.

However, adequately coping with faults caused by damage in other physical layers is difficult when employing protection switching in the PMD layer, and supporting protection switching of data flows above a Media Access Control (MAC) layer in the event of connection with a multi-stage system is difficult when protection switching is employed in some physical layers.

In Operation, Administration and Maintenance (OAM) in the MAC layer or layers above the MAC layer, i.e. in a MAC client domain, management relating to protection switching is performed based on connection to the MAC layer or layers above the MAC layer, particularly when performing the protection switching.

This connection originates and terminates at two flow end points, that is, Management Entity Group (MEG) end points. Ethernet link management and protection switching via a message to monitor a connection status between entities is necessary in an Ethernet network.

In monitoring the connection status for the Ethernet protection switching, continuity check messages between the MEG end points are observed to determine if they normally arrive at a preset frequency for a preset duration. Such a connection status monitoring scheme based on an exchange of the continuity check messages serves to manage and operate connections above the MAC layer without regard to the physical layer and multiple heterogeneous physical layers below the MAC layer.

In the case where a lower part of the physical layer is made of a single link or serially connected single-links, damage to the physical layer causes connections above the physical layer, i.e. exchange of the continuity check messages, to be interrupted. Hence, the Ethernet link management and protection switching may be performed through detection of problems in links and connections.

However, when an aggregation of links connected in parallel is used in some sections, the use of continuity check messages alone may fail to detect reduction of bandwidth due to failure of some links in the group, disrupting Ethernet traffic.

When a link-aggregated section, i.e. parallel connection, is present in a path that is formed by serially connected elements in the Ethernet links, the link aggregation sublayer resides between an Ethernet Client and the MAC layer (MAC Control layer) of the link aggregation sublayer, and the section is regarded as a single link in view of the layer above the MAC layer, i.e. Ethernet MAC Client.

In addition, when multiple Ethernet links are connected in parallel, multiple MAC addresses are present in actuality, but the layer above the MAC layer (i.e. Ethernet MAC Client) uses a single virtual logical MAC address of the link aggregation sublayer.

When all links in a link aggregation are simultaneously changed (by addition, deletion, or errors), the layer above the Ethernet MAC layer may treat the aggregated links as a single link. However, when some links in the link aggregation are changed (by addition, deletion, or errors), the layer above the Ethernet MAC layer should regard the change as variations in bandwidth and adjust the network connection structure. Therefore, an efficient method is needed for Ethernet link management and protection switching.

Further, when some links in the link aggregation have an error or are deleted, some others are still usable depending on a transmission scheme of the link aggregation sublayer and the continuity check messages may be transmitted between the MEG end points. In this case, reduced bandwidth leads to total failure of the Ethernet network. However, this trouble is not detected between the MEG end points and protection switching is not performed.

SUMMARY OF THE INVENTION

The inventors of the present invention have studied a method that enables suitable Ethernet connection management and protection switching based on connections between the Ethernet MAC layer and layers above the Ethernet MAC layer without regard to the configuration of a physical layer below the Ethernet MAC layer, even in the presence of multiple Ethernet devices connected in series and even Ethernet devices connected in parallel (i.e. link aggregation sublayer).

The present invention provides an Ethernet protection switching method that enables adequate Ethernet protection switching to be performed based on a change in an Ethernet link status when a link aggregation sublayer is present in links constituting a lower part of an Ethernet connection.

The present invention discloses an Ethernet protection switching method based on a change in an Ethernet link status including fault in a link aggregation sublayer, including: if the Ethernet link aggregation sublayer is present on an Ethernet connection path, assigning a link aggregation sublayer Management Entity Group (MEG) end point to an Ethernet link aggregation sublayer to generate a link aggregation message for Ethernet connection management and protection switching; and if a change in an Ethernet link status including a fault is detected in the Ethernet link aggregation sublayer, generating and sending the link aggregation message from the link aggregation sublayer MEG end point to an MEG end point performing Ethernet connection management and protection switching.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

FIG. 4 illustrates one exemplary format of a link aggregation message.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
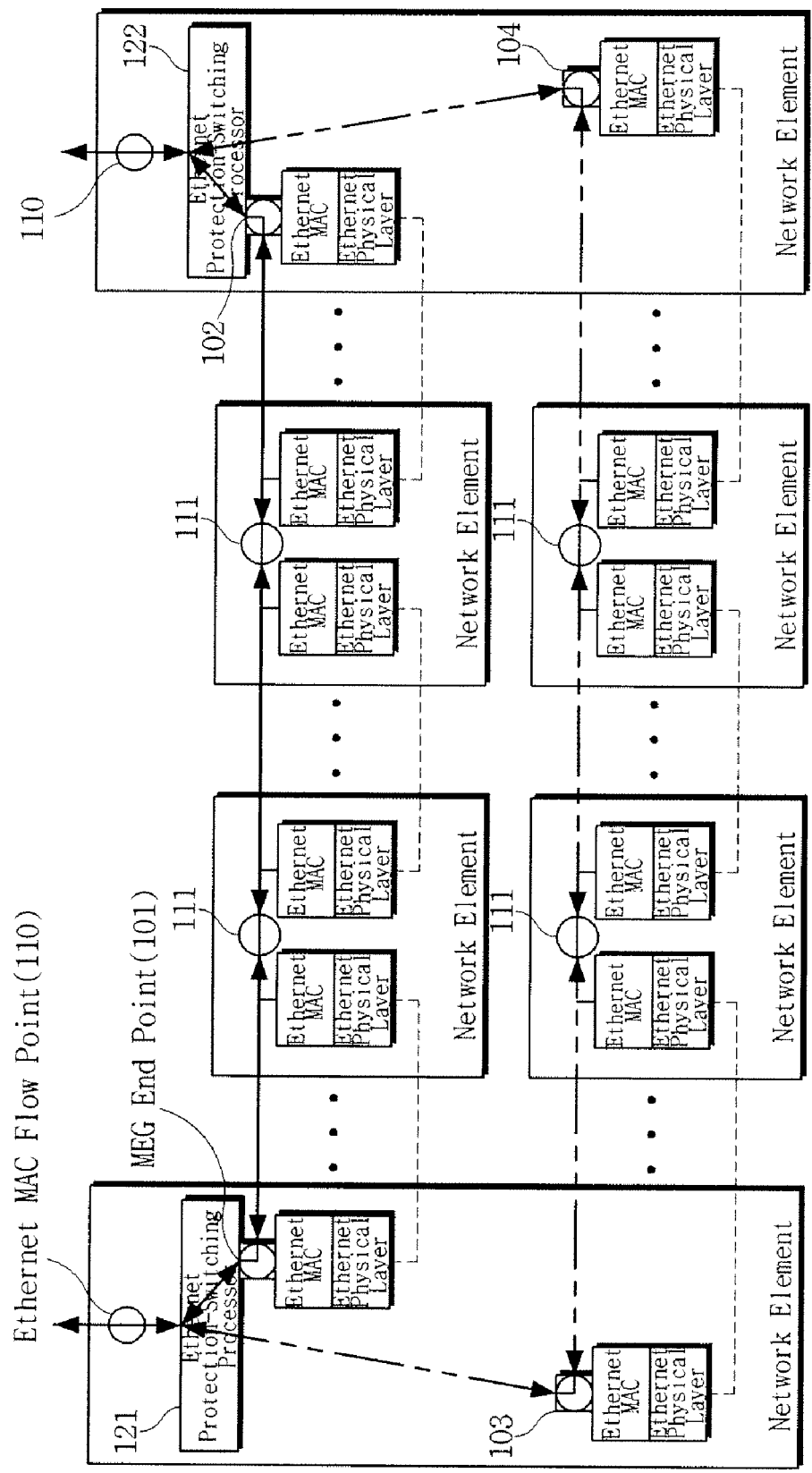
FIG. 1 is a diagram illustrating an example of Ethernet management and protection switching.

FIG. 1 is a diagram illustrating an example of Ethernet management and protection switching. In an Ethernet connection, each of Ethernet MAC flow points 110 and 111 present in individual Ethernet devices determines data flow, and MEG end points 101 and 102 are respectively set to starting and end points of the connection to manage the data flow.

For protection switching, working MEG end points 101 and 102 for a working connection and preliminary MEG end points 103 and 104 for a preliminary connection are provided at terminals between Ethernet protection switching processors 121 and 122. For monitoring connection therebetween, continuity check messages are exchanged between the MEG end points to check a connection status.

In such an exchange of the continuity check messages, when a lower part of a physical layer is made of a single link or multiple single links connected in series, damage to the physical layer naturally results in interruption of the connection at a higher layer, i.e. discontinuation of the continuity check message exchange. Hence, the continuity check message exchange may permit recognition of a link defect and thus enables Ethernet link management and protection switching.

Therefore, a defect-free Ethernet link may be determined by the Ethernet protection switching processors 121 and 122, and the data flow may be directed based on the determination results to higher Ethernet MAC flow points 110 through defect-free working and preliminary link connections.

Figure 2:
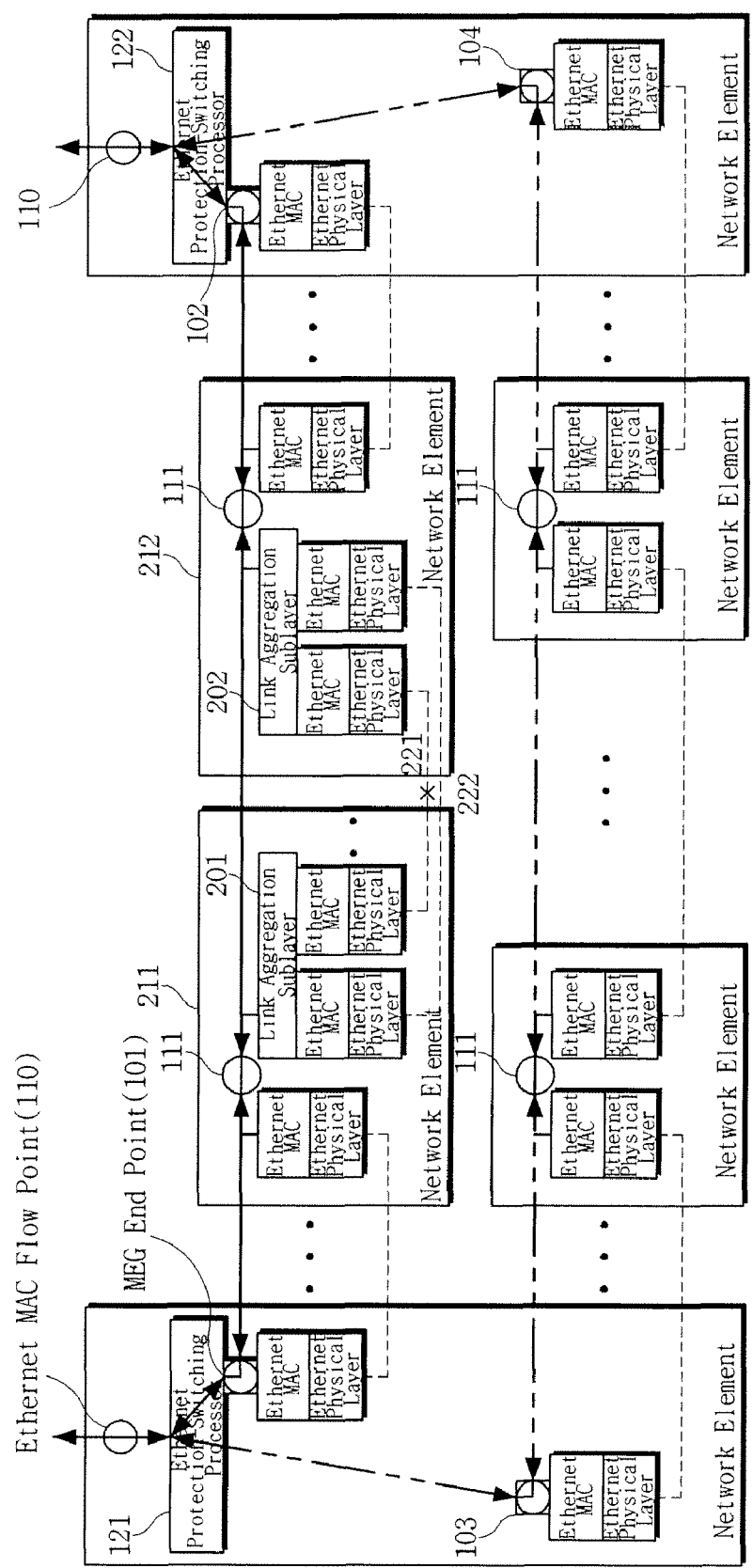
FIG. 2 is a diagram illustrating an example of Ethernet management and protection switching where a section of an Ethernet connection is made of links connected in parallel by link aggregation.

FIG. 2 is a diagram illustrating an example of Ethernet management and protection switching where a section of an Ethernet connection is made of links connected in parallel by link aggregation.

A link aggregation sublayer 201 or 202 is present between an Ethernet Client and a MAC layer (or MAC Control layer) of the link aggregation, and is regarded as a single link in view of a layer above the Ethernet MAC layer, i.e. the Ethernet MAC Client.

In addition, when multiple Ethernet links are connected in parallel, multiple MAC addresses for the link aggregation are present, but the layer above the MAC layer (i.e. Ethernet MAC Client) uses a single virtual logical MAC address in the link aggregation sublayer.

When all links in the link aggregation are simultaneously changed, i.e., added, deleted or failed, the layer above the Ethernet MAC layer may treat the aggregated links as a single link, and the Ethernet connection may be managed and protection-switched in a manner, as described in FIG. 1.

However, when some links in the link aggregation are changed, i.e., added, deleted or failed, the layer above the Ethernet MAC layer will regard the changes as variations in bandwidth and adjust the network connection structure.

For example, even though errors occur in an Ethernet link 221, Ethernet frames flow through another Ethernet link 222 between network devices 211 and 212 depending on a management scheme of the link aggregation sublayer, and Ethernet MAC flow points 110 are maintained, so that the Ethernet connection continues to operate.

As a result, the continuity check messages may be irregularly delayed, interrupted, or arrive at the MEG end points without errors.

However, the link bandwidth for the Ethernet flow is reduced. As the reduction of the link bandwidth becomes severe, frames failing to be transferred due to the bandwidth reduction are accumulated in the network devices 211 and 212, exceeding the processing capacity of the network devices 211 and 212 and causing serious problems such as frame loss.

Figure 3:
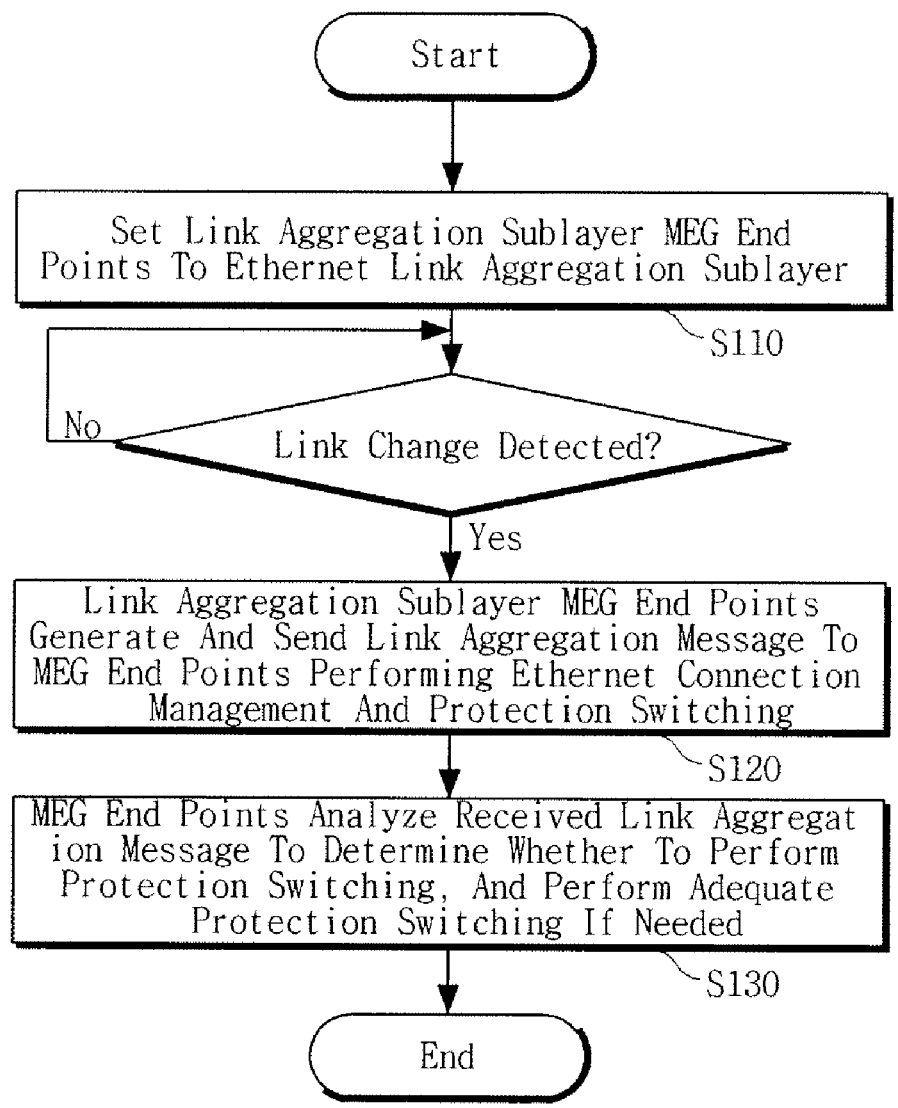
FIG. 3 is a flow chart illustrating an Ethernet protection switching method based on a change in an Ethernet link status in an Ethernet link aggregation sublayer according to an exemplary embodiment of the present invention.

To address these problems, an Ethernet protection switching method based on a change in link status in an Ethernet link aggregation sublayer is proposed. FIG. 3 is a flow chart illustrating an Ethernet protection switching method based on a change in link status in a link aggregation sublayer according to an exemplary embodiment of the present invention.

In operation S110 of the Ethernet protection switching method, if an Ethernet link aggregation sublayer is present on an Ethernet connection path, link aggregation sublayer MEG end points are assigned to the link aggregation sublayer to generate link aggregation messages for Ethernet connection management and protection switching.

If changes in an Ethernet link status including fault are detected in the Ethernet link aggregation sublayer, the link aggregation sublayer MEG end points generate and send the link aggregation messages to MEG end points performing Ethernet connection management and protection switching, in operation S120.

Then, in operation S130, the MEG end points analyze the received link aggregation messages to determine whether to perform protection switching, and perform adequate protection switching according to the determination result.

Accordingly, when the change in an Ethernet link status including fault occurs, the link aggregation sublayer present on links constituting a lower part of an Ethernet connection sends a message requesting determination as to protection switching to the corresponding MEG end points, which in turn analyze the received link aggregation message and perform adequate protection switching if needed. Hence, Ethernet protection switching may be performed adequately even in the presence of the Ethernet link aggregation sublayer, thereby achieving the aforementioned feature of the present invention.

FIG. 4 illustrates one exemplary format of a link aggregation message. As shown in FIG. 4, a link aggregation message may include initial information indicating the initial number of links or bandwidth, change information indicating a change in link status, link aggregation group identification information, link aggregation group member identification information, message type information indicating a protection switching request or response, and message specific information indicating a change caused by normal operation or a change caused by an error.

When a change in an Ethernet link status including fault occurs, the link aggregation sublayer present on links constituting the lower part of the Ethernet connection sends a link aggregation message as illustrated in FIG. 4 to the corresponding MEG end points. The MEG end points may identify the initial number of links or bandwidth of an Ethernet device from initial information present in the received link aggregation message, identify the change level of link status such as the number of added or deleted links or the rate of link addition or deletion from change information of link status, and identify an Ethernet device, in which a change occurred, corresponding to aggregation group identification information and link aggregation group member identification information. Additionally, the MEG end points may determine whether message type information indicates a protection switching request or a response to the request, and determine whether message specific information indicates a change caused by normal operation (link addition or deletion) or a change caused by an error.

Figure 5:
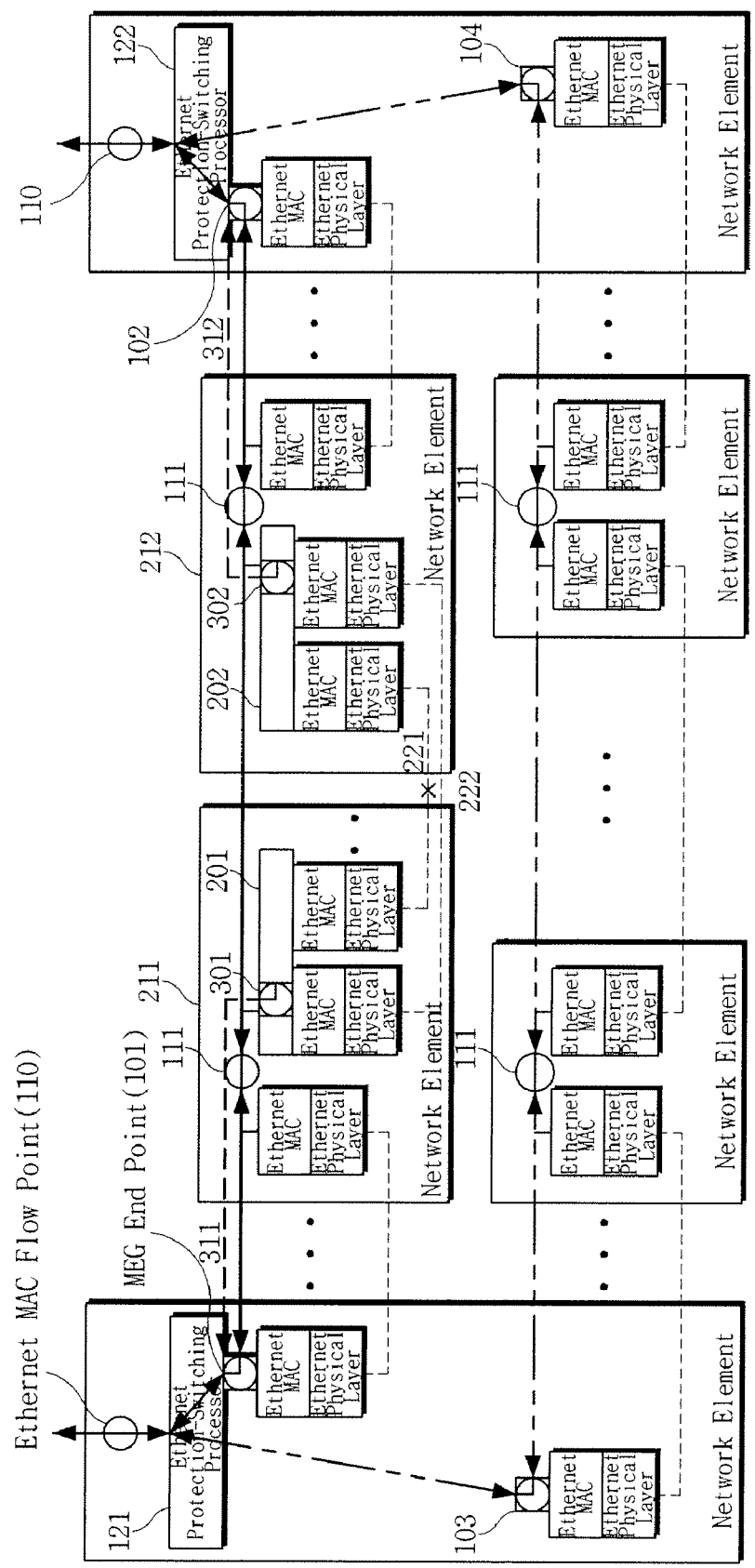
FIG. 5 is a diagram illustrating an operational example of the Ethernet protection switching method according to an exemplary embodiment of the present invention.

An example is described of Ethernet protection switching performed by the Ethernet protection switching method according to an exemplary embodiment of the invention. FIG. 5 is a diagram illustrating an operational example of the Ethernet protection switching method based on a change in link status in an Ethernet link aggregation sublayer.

MEG end points 101 and 102 are set to a switch/router system performing Ethernet flow management and protection switching for a layer above a MAC layer, i.e. Ethernet MAC Client. Further, to achieve adequate Ethernet protection switching even in the presence of an Ethernet link aggregation sublayer, link aggregation sublayer MEG end points 301 and 302 are assigned to Ethernet link aggregation sublayers 201 and 202 to generate link aggregation messages 311 and 312 for enabling Ethernet connection management and protection switching, thereby constituting an Ethernet connection to be used as a preliminary Ethernet connection for protection switching.

When a change in link status occurs due to link addition, link reduction or errors, the link aggregation sublayers 201 and 202 generate and send the link aggregation messages 311 and 312 to the corresponding MEG end points 101 and 102 that perform the Ethernet link management and protection switching. Thus, if link aggregation sublayers are present, the link aggregation sublayer MEG end points 301 and 302 provide the MEG end points with information enabling determination as to whether to perform protection switching. Hence, adequate protection switching may be performed.

In other words, for initial establishment of an Ethernet connection and formation of an Ethernet flow through the Ethernet connection, when all Ethernet links are normal and the Ethernet connection is initially established between the link aggregation sublayer MEG end points 301 and 302, the link aggregation sublayer MEG end points 301 and 302 between MEG end points defining the starting and end points of the Ethernet connection send and receive a message to and from the corresponding MEG end points to set the initial number of links and bandwidth.

In addition to the initial number of links and bandwidth, the MEG end points set the reference number of links and bandwidth for protection switching. For the Ethernet link management and protection switching, whenever the number of links of the link aggregation sublayer changes, for example, due to link addition, link deletion or link failure, the link aggregation sublayer MEG end points 301 and 302 send link aggregation messages 311 and 312 of the change in link status to the corresponding MEG end points.

When the link aggregation sublayer is present on a path of an Ethernet connection, the MEG end points recognize an error and change in the number of links based on the link aggregation messages 311 and 312. If a change that cannot be readily accommodated by a network device occurs, i.e. if there is a change exceeding the reference number of links or bandwidth, the MEG end points perform protection switching to normalize the flow in the Ethernet MAC layer.

As described above, according to exemplary embodiments of the present invention, when a change in an Ethernet link status occurs, a link aggregation sublayer present on links constituting a lower part of an Ethernet connection sends a message requesting determination as to protection switching to a corresponding MEG end point, which in turn analyzes the received link aggregation message and performs adequate protection switching if needed. Hence, Ethernet protection switching may be performed adequately even in the presence of the link aggregation sublayer.

The present invention is industrially applicable to various technical fields requiring a protection switching method that protection-switches an Ethernet link to another link upon occurrence of a problem in an Ethernet link.

As apparent from the above description, according to exemplary embodiments of the present invention, a message requesting determination as to protection switching is sent to MEG end points in response to a change in an Ethernet link status in a link aggregation sublayer present on links constituting a lower part of an Ethernet connection, and then the MEG end points analyze the message and perform adequate protection switching, enabling adequate Ethernet protection switching to be performed even in the presence of the Ethernet link aggregation sublayer.

It will be apparent to those skilled in the art that various modifications can be made to the exemplary embodiments of the present invention described herein without departing from the spirit and scope of the present invention defined by the appended claims and their equivalents.

What is claimed is:

1. An Ethernet protection switching method based on a change in link status in an Ethernet link aggregation sublayer, comprising:

if the Ethernet link aggregation sublayer is present on an Ethernet connection path, assigning a link aggregation sublayer Management Entity Group (MEG) end point to the Ethernet link aggregation sublayer to generate a link aggregation message, which comprises initial information indicating a number of links or bandwidth and link information indicating a change in link status, for Ethernet connection management and protection switching; and if a change in an Ethernet link status including fault is detected in the Ethernet link aggregation sublayer, originally creating and sending the link aggregation message from the link aggregation sublayer MEG end point to an MEG end point performing Ethernet connection management and protection switching, or when the Ethernet connection path is initially set, originally creating and sending the link aggregation message from the link aggregation sublayer MEG end point to an MEG end point performing Ethernet connection management and protection switching.

2. The method according to claim 1, further comprising:
analyzing, by the MEG end point, the received link aggregation message to determine whether to perform the protection switching, followed by performing adequate protection switching in accordance with the determination result.

3. The method according to claim 2, wherein the link aggregation message further comprises link aggregation group identification information and link aggregation group member identification information.

4. The method according to claim 3, wherein the link aggregation message further comprises:
message type information indicating a protection switching request or response; and
message specific information indicating a change caused by normal operation or a change caused by an error.

5. The method according to claim 1, wherein the link aggregation message further comprises link aggregation group identification information and link aggregation group member identification information.

6. The method according to claim 5, wherein the link aggregation message further comprises:
message type information indicating a protection switching request or response; and
message specific information indicating a change caused by normal operation or a change caused by an error.

* * * * *